(12) United States Patent
Teren

(10) Patent No.: US 12,708,111 B1
(45) Date of Patent: Aug. 18, 2026

(54) COVERING DEVICE FOR RESIDENTIAL AND COMMERCIAL TRASH CANS AND METHOD OF USE

(71) Applicant: Darren Mark Teren, Valley Center, CA (US)

(72) Inventor: Darren Mark Teren, Valley Center, CA (US)

( * ) Notice: Subject to any disclaimer, the term of this patent is extended or adjusted under 35 U.S.C. 154(b) by 45 days.

(21) Appl. No.: 18/200,906

(22) Filed: May 23, 2023

Related U.S. Application Data

(63) Continuation-in-part of application No. 17/880,365, filed on Aug. 3, 2022, now Pat. No. 11,672,245.

(51) Int. Cl.
*A01M 29/34* (2011.01)
*B65F 1/14* (2006.01)

(52) U.S. Cl.
CPC ............... *A01M 29/34* (2013.01); *B65F 1/14* (2013.01)

(58) Field of Classification Search
CPC ............ A01M 1/00; A01M 1/20; A01M 1/24; A01M 29/00; A01M 29/12; A01M 29/30; A01M 29/34; B65F 1/14; B65F 1/1452; B65F 1/1468; B65F 1/10
USPC ............. 43/120, 1, 124, 132.1, 131; 52/101; 116/22 A; 220/730; 2/10, 173, 206; 128/206.14, 206.12, 206.19, 206.21, 128/206.25
See application file for complete search history.

(56) References Cited

U.S. PATENT DOCUMENTS 910,485 A * 1/1909 Baumann ............... A41D 10/00 2/206
1,043,774 A * 11/1912 Kirkman ............. A01M 1/2016 220/87.1
1,082,103 A * 12/1913 Welter .................. A01M 1/106 43/118
1,085,701 A * 2/1914 Richman ............... A01M 1/106 43/120
1,114,191 A * 10/1914 Shapiro ................. A01M 1/106 43/120
1,212,660 A * 1/1917 Meade .................. A01M 1/106 43/120
1,244,859 A * 10/1917 Johnson ................ A01M 1/106 43/120
1,290,760 A * 1/1919 Langbein .............. A01M 1/106 43/120
1,321,286 A * 11/1919 Connolly ............ A01M 1/2016 43/120
1,324,727 A * 12/1919 Carlson ................. A01M 1/106 43/115
1,350,402 A * 8/1920 Joseph ...................... B65F 1/14 43/120

(Continued)

FOREIGN PATENT DOCUMENTS

KR 20120030245 A * 3/2012
WO WO-2006088382 A1 * 8/2006 ............. A01M 1/10

*Primary Examiner* — Darren W Ark
(74) *Attorney, Agent, or Firm* — Richard Eldredge; Leavitt Eldredge Law Firm

(57) ABSTRACT

A covering device for providing a barrier against pests, insects, and other debris around the handle of a residential or commercial trash can is disclosed. The device includes a flexible body, body having an elastic band attached near or with a periphery thereof; a lid tether coupled to an upper portion of the body; and one or more body tethers coupled to a lower portion of the body.

2 Claims, 16 Drawing Sheets

(56) References Cited

U.S. PATENT DOCUMENTS 1,463,659 A * 7/1923 Paul ...................... A01M 1/106 43/120
1,467,895 A * 9/1923 Dunseth ................ A01M 1/106 43/120
1,505,014 A * 8/1924 Duncan ................. A01M 1/106 43/120
1,607,249 A * 11/1926 George ................. A01M 1/106 43/120
1,719,186 A * 7/1929 Lowy ........................ B65F 7/00 220/87.1
1,815,122 A * 7/1931 Blackford ............. A01M 1/106 43/120
2,636,175 A * 4/1953 Hoffman, Jr. ........ A41D 27/136 2/323
2,721,099 A * 10/1955 Rupp .................. A01M 1/2055 239/57
2,808,679 A * 10/1957 Collins ................ A01M 1/2011 43/131
2,921,581 A * 1/1960 Swearingen ......... A62B 18/025 128/206.25
3,098,703 A * 7/1963 Snyder ................ A01M 1/2055 514/723
3,303,599 A * 2/1967 Ballard ................. A01M 1/106 43/118
3,480,176 A * 11/1969 Boyd .................... A01M 29/24 220/730
3,661,326 A * 5/1972 Wilson ................ A01M 1/2055 220/87.1
3,664,335 A * 5/1972 Boucher ............. A41D 13/113 128/206.19
3,779,244 A * 12/1973 Weeks, Jr. ......... A41D 13/1146 55/DIG. 35
RE28,102 E * 8/1974 Mayhew ............ A41D 13/1115 128/206.19
3,834,384 A * 9/1974 Raines ................... A41D 13/11 128/201.15
4,100,624 A * 7/1978 Davis ..................... A41B 11/14 2/409
4,105,144 A * 8/1978 Lin ..................... A01M 1/2044 206/532
4,202,472 A * 5/1980 Lin ..................... A01M 1/2055 206/532
4,203,479 A * 5/1980 Mathews .................. B65F 1/00 383/117
4,643,182 A * 2/1987 Klein ................. B01D 39/2055 55/DIG. 35
4,797,956 A * 1/1989 Boyce ..................... A61F 9/025 2/13
4,881,671 A * 11/1989 Horton ..................... A45C 1/04 43/132.1
4,941,210 A * 7/1990 Konucik ................ A41D 27/13 2/195.3
4,944,294 A * 7/1990 Borek, Jr. ................. A61F 9/02 128/201.15
4,966,140 A * 10/1990 Herzberg ............... A42B 1/045 128/206.13
5,280,684 A * 1/1994 Filonczuk ............. A01M 1/223 43/120
5,347,657 A * 9/1994 Unsell .................... A41D 7/005 2/400
5,359,805 A * 11/1994 Kadokura ............. A01M 29/08 43/108
5,383,450 A * 1/1995 Hubbard ............ A41D 13/1184 2/427
5,406,944 A * 4/1995 Gazzara ............... A62B 18/082 128/201.12
5,446,925 A * 9/1995 Baker ....................... A61F 9/02 2/9
5,561,863 A * 10/1996 Carlson, II ......... A41D 13/1115 2/206
5,656,368 A * 8/1997 Braun ....................... B32B 3/28 210/493.1
5,682,879 A * 11/1997 Bowers ................ A62B 18/082 128/201.12
5,803,075 A * 9/1998 Yavitz ................ A41D 13/1115 128/206.28
5,813,398 A * 9/1998 Baird ................. A41D 13/1115 128/206.13
5,819,466 A * 10/1998 Aesch ................... A01M 1/245 52/404.2
5,850,808 A * 12/1998 Burdick ................ A01M 29/26 119/713
5,884,426 A * 3/1999 Ishida ................... A01M 29/26 116/22 A
5,884,801 A * 3/1999 Simpson ............... B65F 1/0006 220/495.08
6,026,511 A * 2/2000 Baumann ................ A61F 9/029 2/9
6,062,220 A * 5/2000 Whitaker ............... A62B 18/08 128/206.19
6,062,412 A * 5/2000 Jacobsmeyer, Jr. ....... B65F 1/16 220/259.5
6,185,740 B1 * 2/2001 Zegarelli ................. A61F 9/045 128/857
6,477,977 B1 * 11/2002 Combes ................ A01M 29/32 114/343
6,659,970 B1 * 12/2003 Woodworth .......... A61F 15/006 602/42
6,694,971 B2 * 2/2004 Schroeder ............ A62B 23/025 128/201.14
6,828,578 B2 * 12/2004 DeMeo .................. A41D 13/11 250/516.1
6,886,563 B2 * 5/2005 Bostock ................. A41D 13/11 128/206.19
6,978,782 B2 * 12/2005 Tayebi ................ A62B 23/025 128/201.17
7,077,140 B1 * 7/2006 Berke ................ A41D 13/1176 128/206.28
7,197,774 B2 * 4/2007 Curran .................... A61F 9/068 128/201.25
7,530,354 B2 * 5/2009 Hanlon .................. A62B 23/06 128/206.14
7,549,180 B2 * 6/2009 Matsumoto ............... A61F 9/02 2/436
7,866,679 B1 * 1/2011 Leon ..................... B65F 1/1426 280/79.5
8,110,061 B2 * 2/2012 Moore ................... A62B 23/06 128/205.27
8,261,375 B1 * 9/2012 Reaux ................ A41D 13/1184 128/201.15
8,387,619 B2 * 3/2013 Lee ................... A61M 16/0633 128/207.11
8,490,324 B2 * 7/2013 Highet .................. B65F 1/1473 43/131
8,657,139 B1 * 2/2014 Bodine ..................... A61L 9/12 220/730
8,938,812 B1 * 1/2015 Gandy ................... A41D 27/13 2/55
9,497,954 B1 * 11/2016 Veasey, III .......... A01M 13/003
9,504,244 B2 * 11/2016 Highet ................ A01M 25/004
9,770,611 B2 * 9/2017 Facer ..................... A41D 13/11
9,992,992 B1 * 6/2018 Edelen .................. A01M 29/34
10,098,336 B2 * 10/2018 Darnell ................. A01M 1/106
10,285,395 B1 * 5/2019 Ehrenberg ............ A01M 29/30
10,575,514 B1 * 3/2020 Sasaki ...................... G02C 7/10
10,575,572 B2 * 3/2020 Kakinuma ............... G02B 1/18
11,459,172 B2 * 10/2022 Martin, II ............. B65F 1/1646
11,518,610 B2 * 12/2022 Miller .................. B65F 1/1646
11,523,601 B2 * 12/2022 Mateer .................. A01N 25/18
11,672,245 B1 * 6/2023 Teren ........................ B65F 1/14 43/114
11,684,096 B2 * 6/2023 Lee .................... A41D 13/1115 128/206.19
11,812,737 B1 * 11/2023 Teren ........................ B65F 1/14
2003/0136410 A1 * 7/2003 Matich ................... A62B 18/08 128/206.25
2003/0167550 A1 * 9/2003 Andrews ............. A41D 27/133 2/53

(56) References Cited

U.S. PATENT DOCUMENTS

2003/0186604 A1* 10/2003 Nourigat ................. A01M 1/04 428/114
2006/0101707 A1* 5/2006 James ................. A01M 1/2055 43/132.1
2006/0242891 A1* 11/2006 Marshall ............... A01M 29/34 43/132.1
2007/0067888 A1* 3/2007 Manier .................. A41D 31/12 2/53
2007/0295334 A1* 12/2007 Nonomura ............. D21H 21/36 128/206.13
2008/0163409 A1* 7/2008 Humiston ............... A01M 1/14 2/410
2008/0163541 A1* 7/2008 Harris ....................... B65F 1/16 43/131
2009/0277451 A1* 11/2009 Weinberg ........... A41D 13/1176 128/206.16
2010/0236470 A1* 9/2010 Doty, III ............... A01M 29/06 116/22 A
2011/0065359 A1* 3/2011 Kenny ..................... A41C 3/12 450/39
2011/0155137 A1* 6/2011 Martin ............... A41D 13/1146 29/527.1
2011/0220109 A1* 9/2011 Chiu .................. A41D 13/1161 128/206.19
2011/0271955 A1* 11/2011 Palomo .............. A41D 13/1115 128/206.16
2011/0308525 A1* 12/2011 Lu ...................... A41D 13/1115 128/206.19
2012/0060258 A1* 3/2012 Stewart ................... B32B 5/022 2/206
2012/0060843 A1* 3/2012 Magidson .......... A41D 13/1146 128/206.19
2012/0103339 A1* 5/2012 Koehler ................. A62B 18/02 128/206.14
2012/0291336 A1* 11/2012 Friend ..................... A01M 1/14 43/131
2013/0255134 A1* 10/2013 Robinson ................ A01M 1/14 43/114
2014/0069976 A1* 3/2014 Osher .................. A01K 27/008 221/26
2014/0209098 A1* 7/2014 Dunn ....................... D04B 1/22 112/475.11
2014/0290122 A1* 10/2014 Vasudeva .............. A01M 1/103 43/58
2014/0360502 A1* 12/2014 Kushida ............ A61M 16/0694 128/206.25
2015/0150326 A1* 6/2015 Gains ....................... A41G 7/00 2/206
2015/0335007 A1* 11/2015 Donoho .................... E04B 1/72 52/101
2016/0029616 A1* 2/2016 Johnston ............... E06B 7/2309 43/132.1
2016/0052714 A1* 2/2016 McDade ............... B65F 1/1615 220/730
2016/0157441 A1* 6/2016 Esler .................. A01G 13/0237 43/124
2017/0127662 A1* 5/2017 Gajdicar ............... A01M 29/14
2017/0231297 A1* 8/2017 German ............. A41D 13/1107 2/206
2017/0320667 A1* 11/2017 Stone .................... E05B 63/143
2019/0075782 A1* 3/2019 Pradines ............... A01M 1/245
2020/0107535 A1* 4/2020 Hutter ..................... A01M 1/14
2020/0240551 A1* 7/2020 Escure .................... F16L 3/233
2020/0331696 A1* 10/2020 Foster ................... B65F 1/1615
2020/0346853 A1* 11/2020 Thompson-Buist ...... B65F 1/14
2021/0137093 A1* 5/2021 Gonzales ............... A01N 59/00
2022/0015349 A1* 1/2022 Toon, Jr. ............... A01M 29/12
2022/0104478 A1* 4/2022 Chang ................... A01M 29/34
2022/0132949 A1* 5/2022 Ambartsoumian .... A62B 23/06 128/206.19
2022/0297933 A1* 9/2022 Elaywan ............... B65F 1/1646
2023/0157388 A1* 5/2023 Sablone ................. A41H 43/04 128/206.19
2025/0011080 A1* 1/2025 Boye ..................... A01M 29/12

* cited by examiner

COVERING DEVICE FOR RESIDENTIAL AND COMMERCIAL TRASH CANS AND METHOD OF USE

CROSS REFERENCE TO RELATED APPLICATIONS

This application is a continuation of U.S. application Ser. No. 17/961,354, filed Oct. 6, 2022, which is a continuation of U.S. application Ser. No. 17/880,365, filed Aug. 3, 2022. Each of the aforementioned applications is hereby incorporated by reference in its entirety.

BACKGROUND

1. Field of the Invention

The present invention relates generally to trash cans, and more specifically to a covering device that provides a barrier against pests, insects, and other debris on a handle of a residential or commercial trash can.

2. Description of Related Art

Consumers often place their garbage into residential and commercial trash cans for subsequent disposal. For example, FIG. 1 depicts a conventional trash can 101 having a container body 103, a lid 105, and a handle 107. Typically, the handle 107 includes a hand grip portion 109 secured to the body 103 via support members (e.g., support members 111*a*, 111*b*). During use, the user can use the handle 107 to maneuver and transport the trash can 101 as needed and desired.

One of the problems commonly associated with the trash can 101 is its proneness of attracting pests and insects. For example, after placing garbage into the container body 103, the garbage often produces an unpleasant atmosphere and thus attracts pests and insects. While the lid 105 provides a barrier to prevent pests and insects from entering the container body 103, the handle 107 is left unprotected. Pests such as spiders often form spider webs around the handle 107, posing significant safety risk.

Accordingly, it is an object of the present invention to provide a covering device that protects the handles of residential and commercial trash cans from pests, insects, and debris from accessing.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
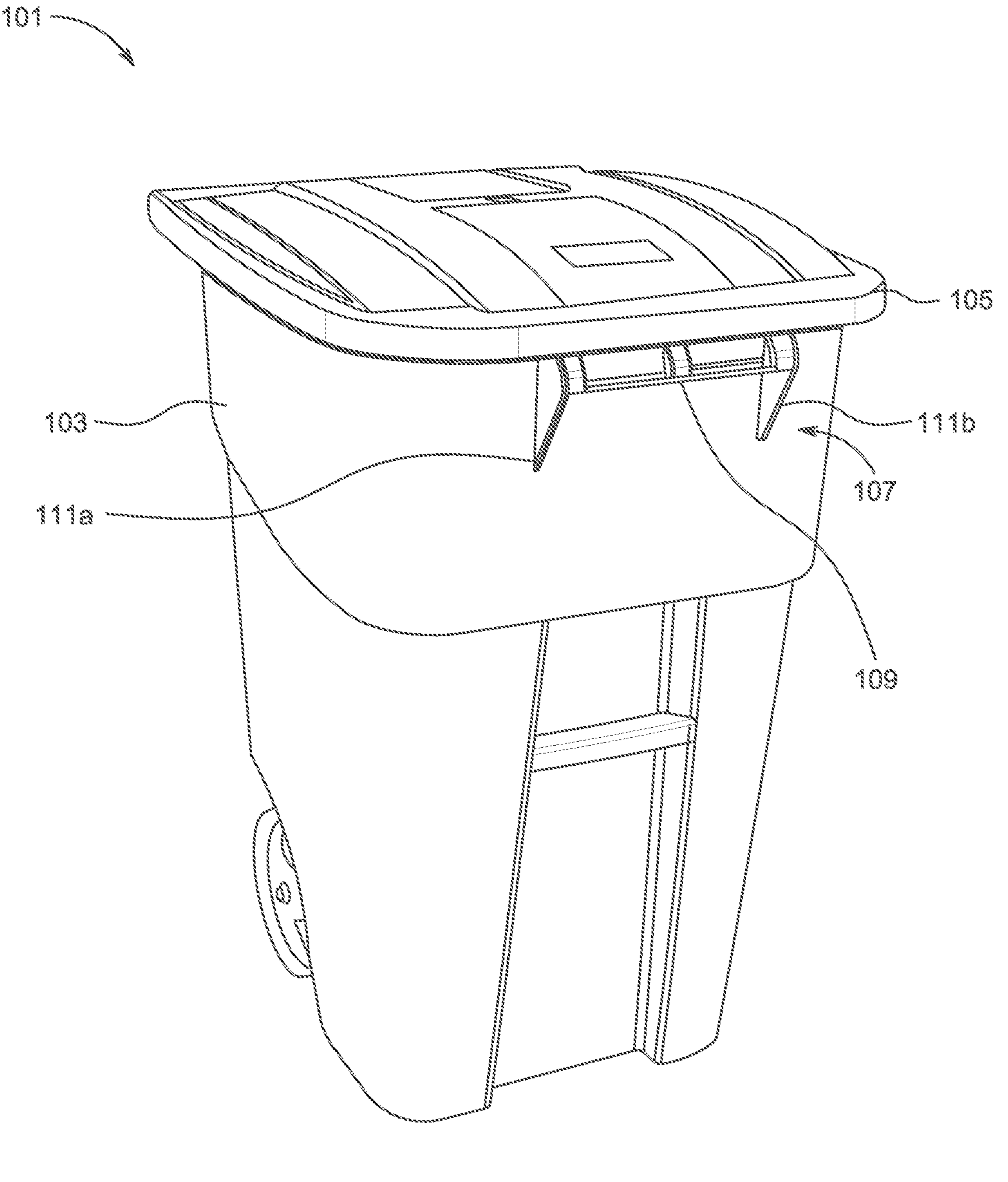
FIG. 1 is a perspective view of a common trash can.

While the system and method of use of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional trash cans. Specifically, the present invention provides for a solution to prevent pests and insects from occupying the handles of residential and commercial trash cans without the use of chemicals or manual cleaning. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
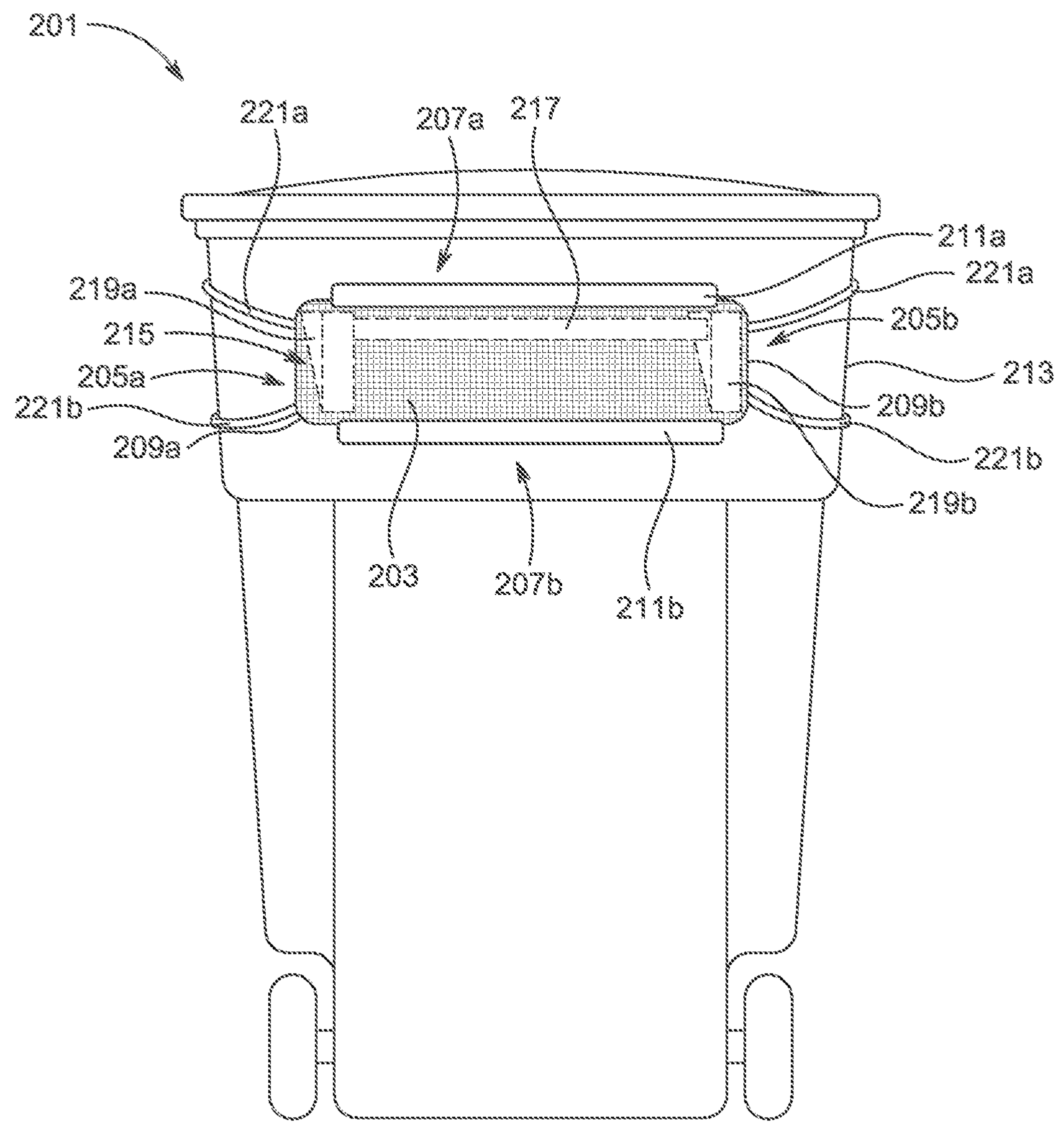
FIG. 2 is a front view of a pest control device in use on a trash can in accordance with one or more embodiments of the present application.

Referring now to the drawings wherein like reference characters identify corresponding or similar elements throughout the several views, FIG. 2 depicts a front view of a pest control device 201 in accordance with one or more embodiments of the present application. It will be appreciated that device 201 overcomes one or more of the above-listed problems commonly associated with conventional residential trash cans.

In the contemplated embodiment, the pest control device 201 includes a generally rectangular shaped, flexible body 203 having a first set of opposing ends 205*a*, 205*b* and a second set of opposing ends 207*a*, 207*b*, wherein each set of opposing ends are generally perpendicular between the other. In the preferred embodiment, the body 203 is constructed of micromesh netting or thin plastic film.

The pest control device 201 also includes a pair of elastic bands 209*a*, 209*b*, each of which borders opposing ends 205*a*, 205*b*, respectively. The elastic bands 209*a*, 209*b* provide for an adjustable friction fit at both ends.

The pest control device 201 further includes a pair of peel-off adhesive tape 211*a*, 211*b*, each of which borders opposing ends 207*a*, 207*b*. The adhesive tape 211*a*, 211*b* provide for a semi-permanent connection point. In the preferred embodiment, the adhesive tape 211*a*, 211*b* is waterproof.

During use, the elastic bands 209*a*, 209*b* are wrapped over the support members 219*a*, 219*b* of a handle 215 of a residential trash can 213, thereby encapsulating the entire handle 215. The adhesive tape 211*a*, 211*b* stick to the outer surface of the trash can 213 to seal off the handle 215. It should be appreciated that the adhesive tape 211*a*, 211*b* prevent environmental conditions and human interaction from jarring the pest control device 201 out of position from the handle 215. In addition, it should be appreciated that the body 203 is constructed with enough material to allow the handle grip portion 217 to be grasped by the user when maneuvering or transporting the trash can 213.

In some embodiments, the pest control device 201 also includes a pair of tethers 221*a*, 221*b*, each tether connecting opposing ends 205*a*, 205*b*. The tethers 221*a*, 221*b* are configured to wrap around the parameter of the trash can 213. The tethers 221*a*, 221*b* can employ a fastening mechanism (e.g., buckles) or is stretchable so that the pest control device 201 is securely held against the trash can 213.

It should also be appreciated that one of the unique features believed characteristic of the present application is the configuration of features, namely the body, elastic bands, and adhesive tape, that allow for the user seal off the handle of a trash can from pests, insects, and various environmental conditions from accumulating around the handle without the use of chemical pesticides or manual cleaning.

Figure 3:
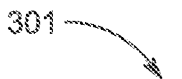
FIG. 3 is a flowchart of a method of use of the pest control devices of the present invention.
Figure 3:
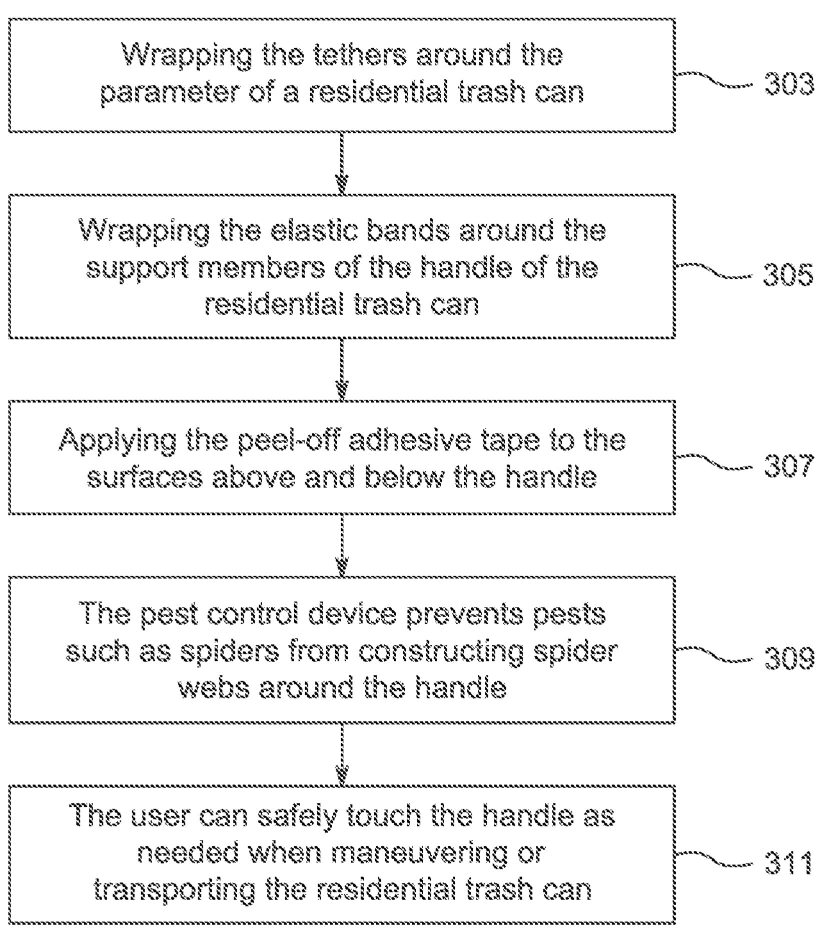

In FIG. 3, a flowchart 301 depicts a method of use of the pest control device 201. During use, the user can wrap the tethers around the parameter of a residential trash can, as shown with box 303. It should be appreciated that the residential trash can may be a commercial trash can. The user can then wrap the elastic bands over the support members of the handle of a residential trash can, as shown with box 305. Next, the user can apply the peel-off the adhesive tape to the surfaces above and below the handle, as shown with box 307. The pest control device prevents pests such as spiders from constructing spider webs around the handle, as shown with box 309. The user can then safely touch the handle as needed when maneuvering or transporting the residential trash can, as shown with box 311.

Figure 4:
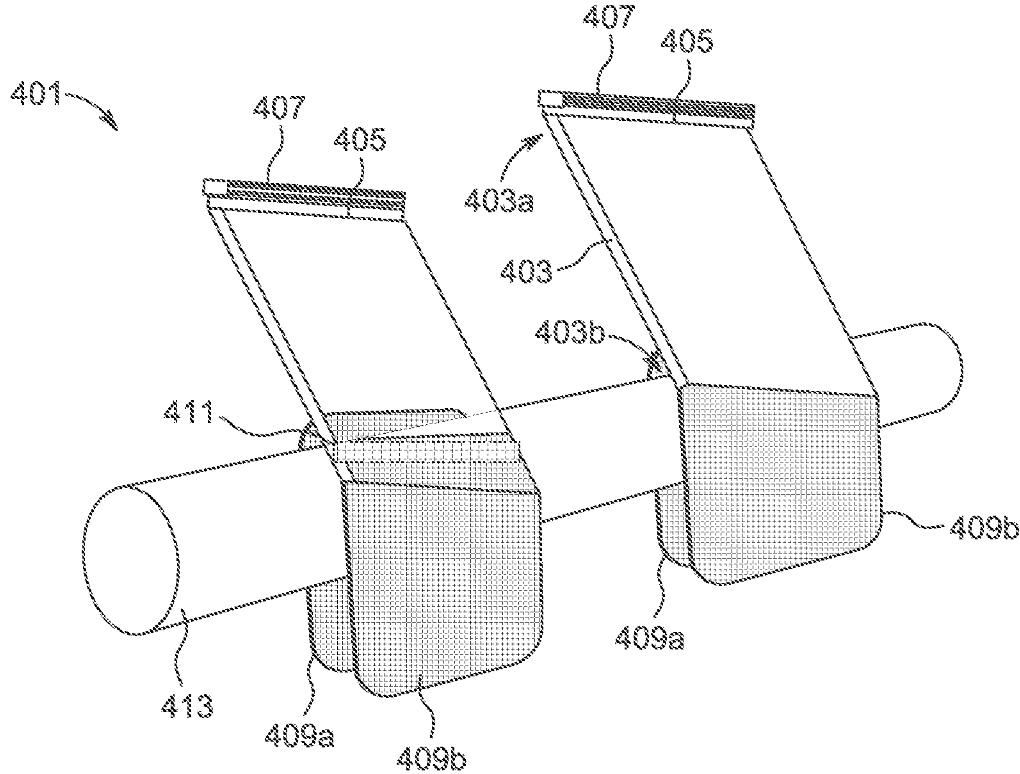
FIG. 4 is a perspective view of a wearable protection device in use on a handle in accordance with one or more embodiments of the present application.

In FIG. 4, a perspective view of a wearable protection device 401 in use is illustrated. It should be understood that a user may employ a second wearable protection device so that the user can protect both of their hands when maneuvering a handle of a trash can.

As shown, the device 401 includes a sleeve body 403 having a first end 403*a* and a second end 403*b*. The first end 403*a* includes a mouth 405 that is closeable via a mechanical closure 407. The second end 403*b* includes and a pair of mitten appendages 409*a*, 409*b* for a user to place their fingers and thumb therein. In some embodiments, the sleeve body 403 can be solid or mesh. In the preferred embodiment, the pair of mitten appendages 409*a*, 409*b* is made of mesh netting. The device 401 also includes a peelable semi-permanent adhesive tape 411 positioned at the base of the pair of mitten appendages 409*a*, 409*b*.

During use, the semi-permanent adhesive tape 411 is peeled to expose its adhesive side. The user can insert their hand into the sleeve body 403 via the mouth 405 and position their fingers in one mitten appendage and their thumb in the other mitten appendage. The user can then grab a handle 413 while wearing the device 401.

Figure 5:
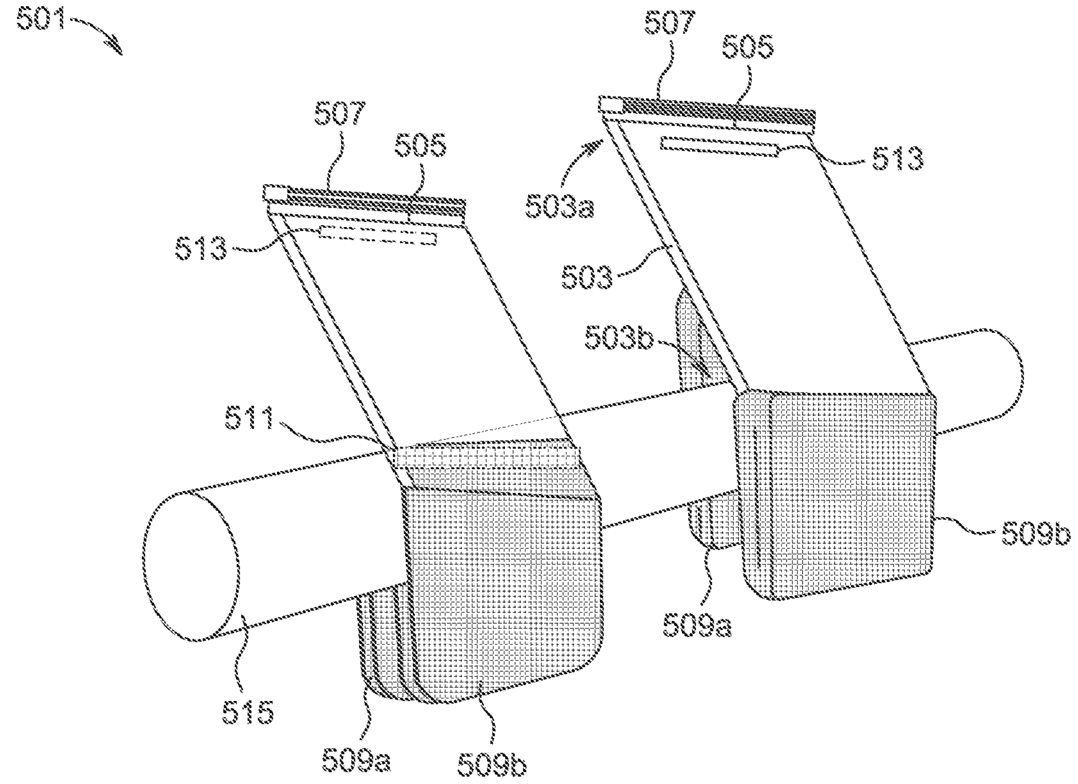
FIG. 5 is a perspective view of an alternative wearable protection device in use on a handle in accordance with one or more embodiments of the present application.

In FIG. 5, a perspective view of an alternative wearable protection device 501 in use is illustrated. It should be understood that a user may employ a second wearable protection device so that the user can protect both of their hands when maneuvering a handle of a trash can.

As shown, the device 501 includes a pleated sleeve body 503 having a first end 503*a* and a second end 503*b*. The first end 503*a* includes a mouth 505 that is closeable via a mechanical closure 507. The second end 503*b* includes and a pair of mitten appendages 509*a*, 509*b* for a user to place their fingers and thumb therein. In some embodiments, the sleeve body 503 can be solid or mesh. In the preferred embodiment, the pair of mitten appendages 509*a*, 509*b* is made of pleated mesh pockets. The device 501 also includes a peelable semi-permanent adhesive tape 511 positioned at the base of the pair of mitten appendages 509*a*, 509*b*. The device 501 further includes an adjustable, malleable, structural wire tab 513 positioned on a top upper surface of the sleeve body 503. The tab 513 is configured to provide shape and hold open the mouth 505. It should be appreciated that the tab 513 allows the user to insert a hand through the mouth 505 without the need to use their opposite free hand to manually hold open the mouth 505.

During use, the semi-permanent adhesive tape 511 is peeled to expose its adhesive side. The user can insert their hand into the sleeve body 503 via the mouth 505 and position their fingers in one mitten appendage and their thumb in the other mitten appendage. The user can then grab a handle 515 while wearing the device 501.

It should be appreciated that the wearable protection devices 401, 501 is shaped to be universal to both hands in any plane.

In addition, it should be appreciated that the wearable protection devices 401, 501 may be made from any suitable or desired materials. For example, the wearable protection devices 401, 501 may be coated with anti-microbial materials to provide further protection for the user. In another example, the wearable protection devices 401, 501 may comprise of printed, coated paper that can be used for commercial print advertising placements.

It should also be appreciated that one of the unique features believed characteristic of the present application is the inclusion of the mechanical closure for the mouth of the sleeve body which prevents contamination and unwanted access from entering therein. In addition, the adhesive tape keeps the wearable protection device attached to a handle and remain in service at-all-times or until removal of the device is desired.

Figure 6:
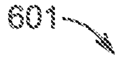
FIG. 6 is a flowchart of a method of use of the wearable protection devices of the present invention.
Figure 6:
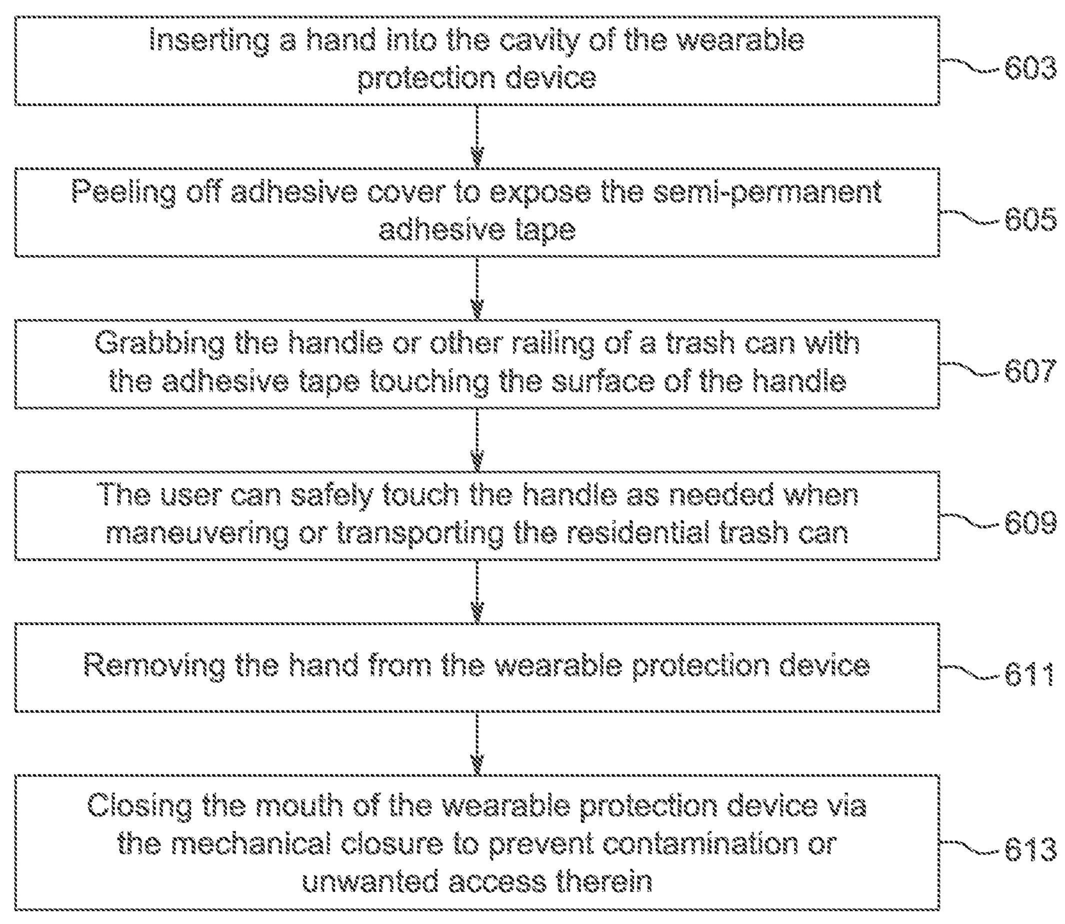
Figure 7:
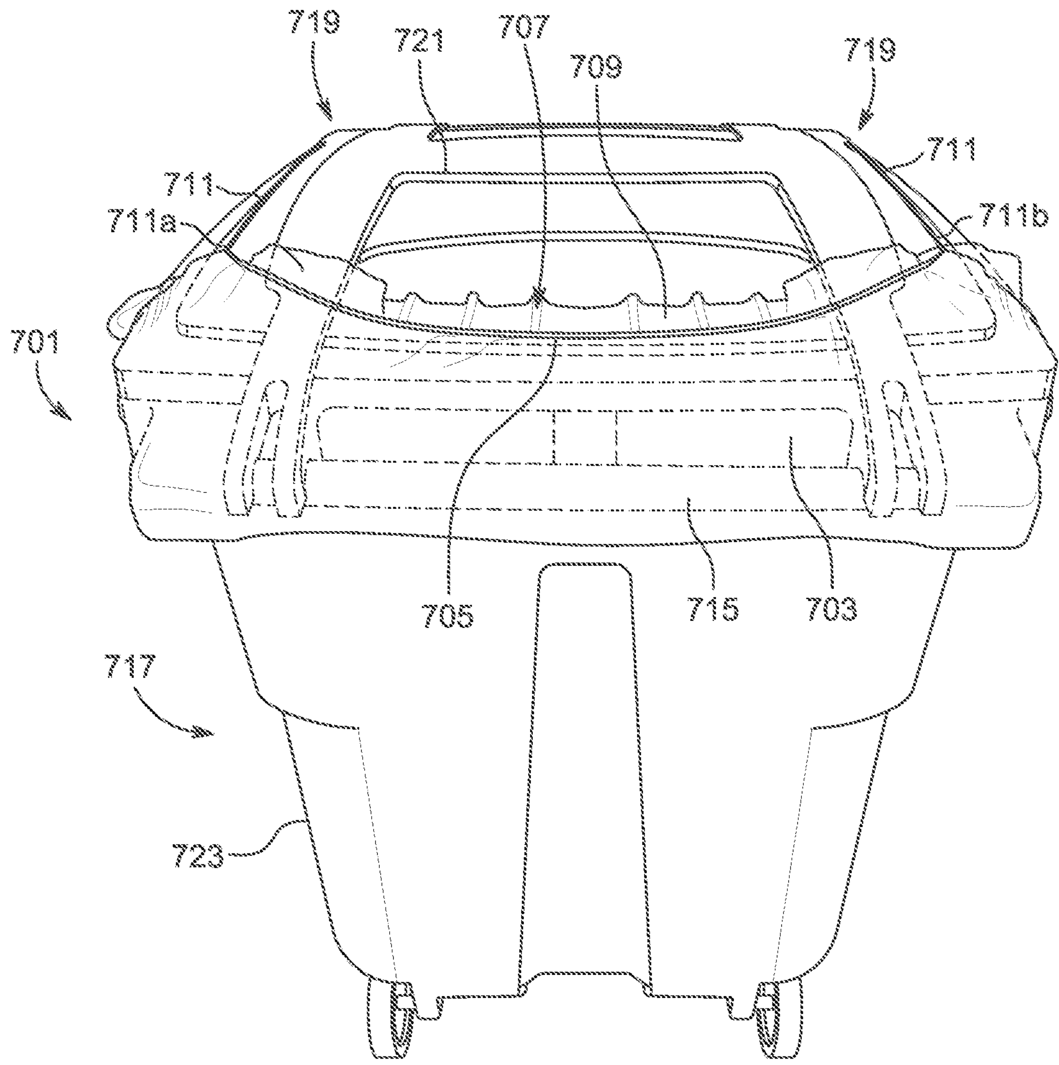
FIG. 7 is a front view of a covering device in use on a handle of a trash can in accordance with one or more embodiments of the present application.
Figure 8:
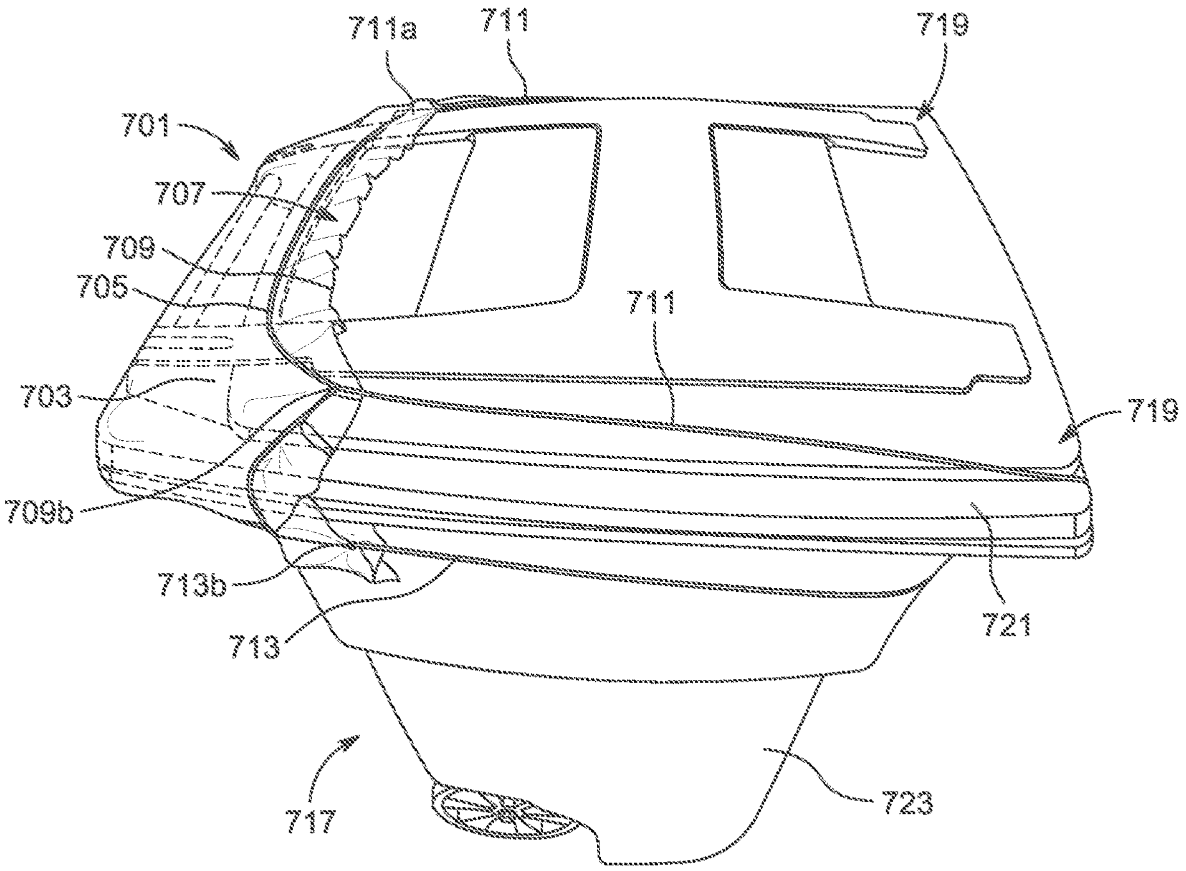
FIG. 8 is an elevated view of the covering device of FIG. 7.
Figure 9:
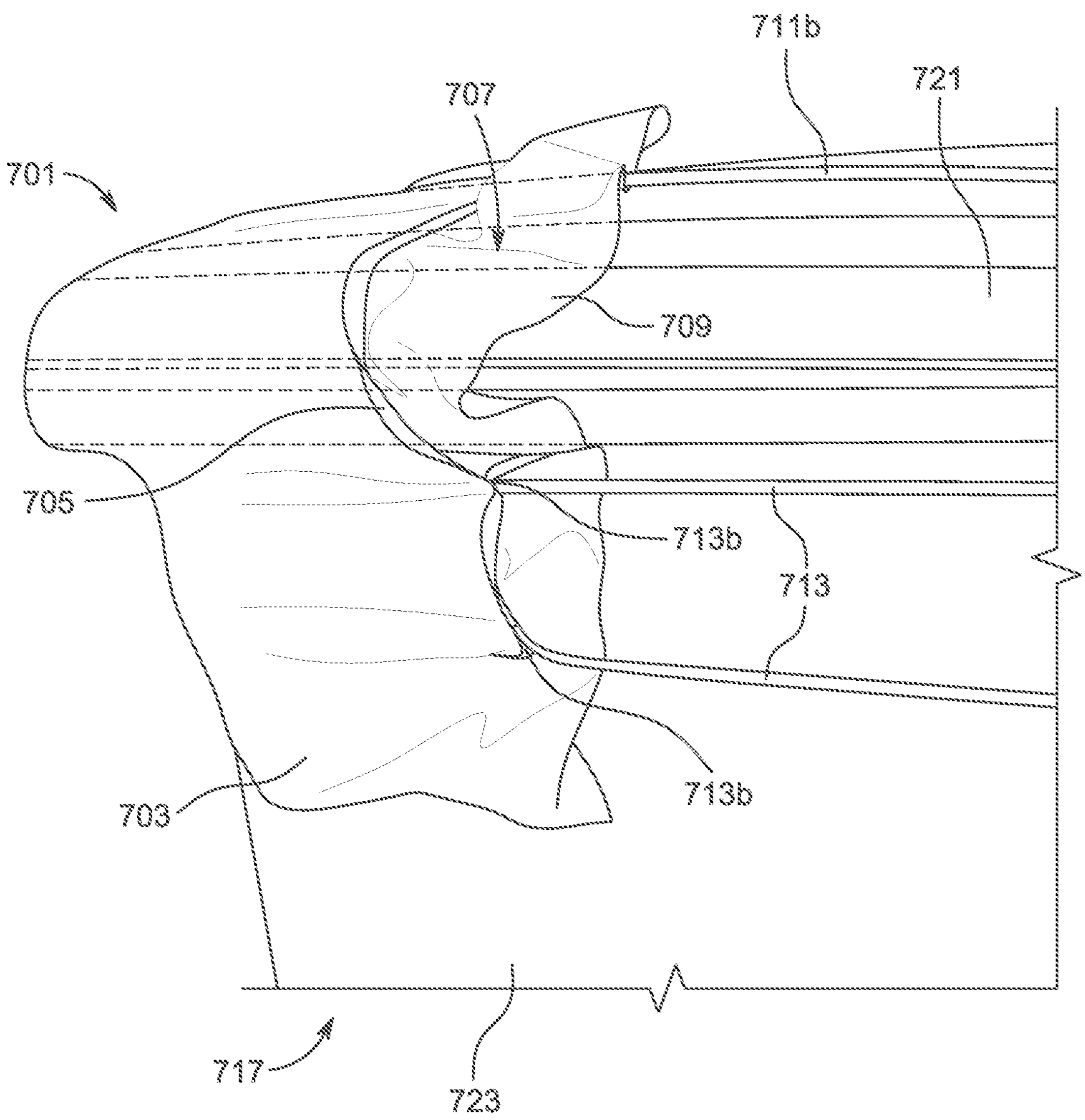
FIG. 9 is a closeup side view of the covering device of FIG. 7.
Figure 10:
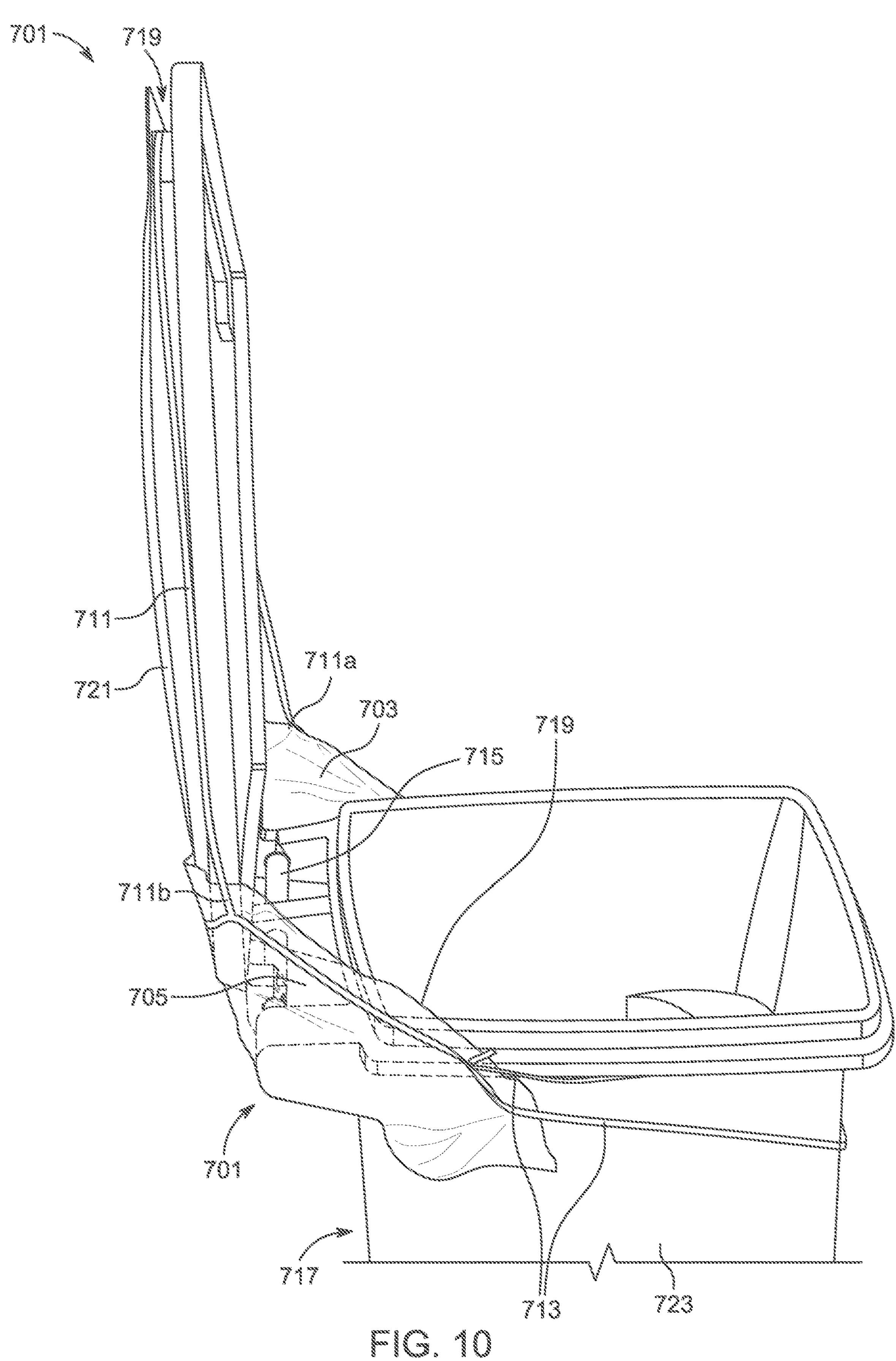
FIG. 10 is a perspective view of the covering device of FIG. 7, illustrating the lid of the trash can in an open position.

In FIG. 6, a flowchart 601 depicts a method of use of the wearable protection devices of the present invention. During use, the user can insert their hand into the cavity of the wearable protection device, as shown with box 603. The user can then peel off the adhesive cover to expose the semi-permanent adhesive tape, as shown with box 605. Next, the user can grab the handle or other railing of a trash can with the adhesive tape touching the surface of the handle, as shown with box 607. The user can then safely touch the handle as needed when maneuvering or transporting the residential trash can, as shown with box 609. After removing their hand from the wearable protection device, the user can close the mouth of the wearable protection device via the mechanical closure to prevent contamination or unwanted access therein, as shown with boxes 611, 613.

Referring now to FIGS. 7 through 10, several views of a covering device 701 are depicted in accordance with one or more embodiments of the present application.

The covering device 701 comprises a generally rectangularly shaped, flexible body 703 having an elastic band 705 preferably attached near or with a periphery 707 of the body 703, creating a ruffled trimming 709. In one embodiment, the elastic band 705 is attached approximately 3 inches inset from the periphery 707.

The covering device 701 also includes a lid tether 711 having a first end 711*a* and a second 711*b*, wherein the ends 711*a*, 711*b* couple to an upper portion of the body 703. In the preferred embodiment, the lids tether 711 is an elastic band.

The covering device 701 further includes one or more body tethers 713 having a first end (not shown) and a second end 713*b*, wherein the ends couple to a lower portion of the body 703. In the preferred embodiment, the one or more body tethers 713 are elastic bands.

During use, the elastic band 705 is wrapped over a handle 715 of a residential or commercial trash can 717, thereby encapsulating the entire handle 715. It should be understood that the body 703 of the covering device 701 is dimensioned and configured to contain the handle 715. The lid tether 711 is wrapped around molding 719 of a lid 721 of the trash can 717. The one or more body tethers 713 are wrapped around a body 723 of the trash can 717. It should be understood that the lid tether 711 and the one or more body tethers 713 work in unison, creating a mechanical, elasticized clamshell effect between the lid 721 and the body 723.

Figure 12:
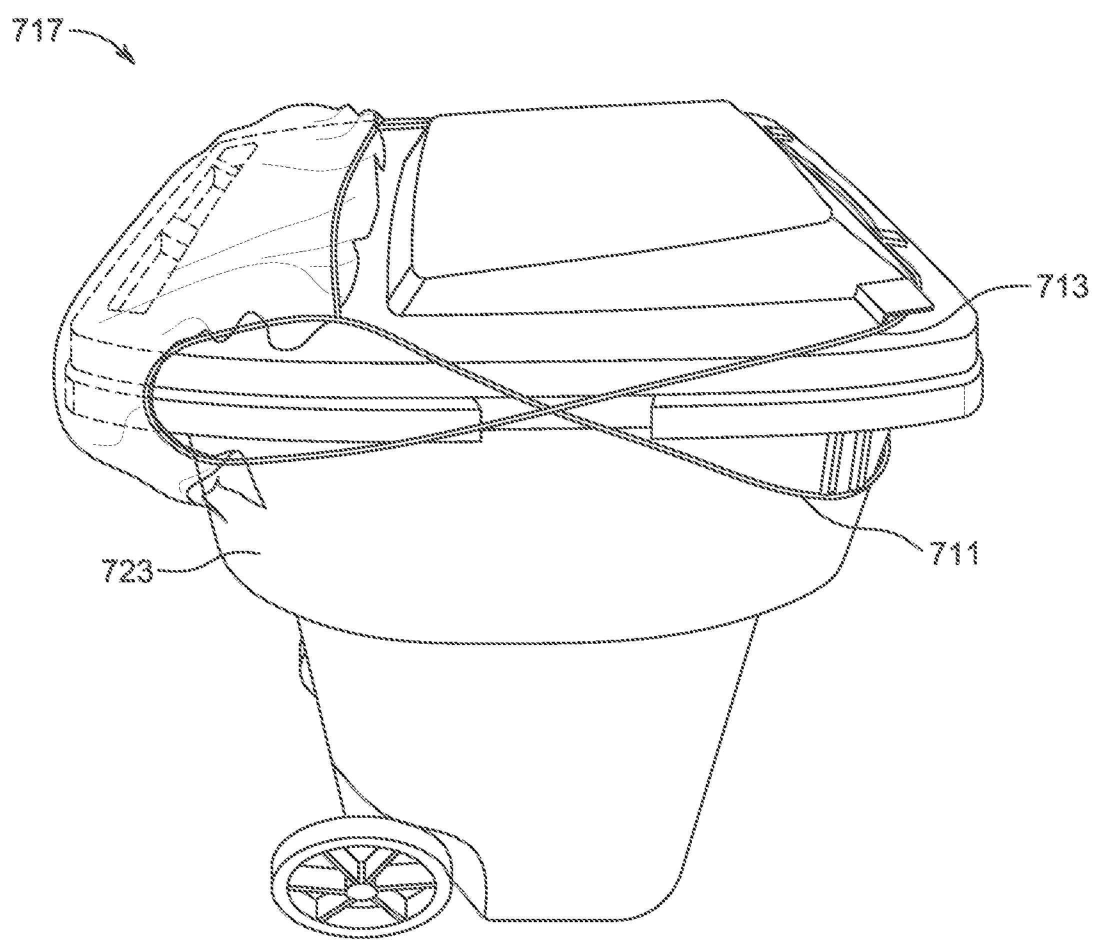
FIG. 12 is an illustration of tethers in the crisscross position with a trash can lid in a closed configuration.
Figure 13:
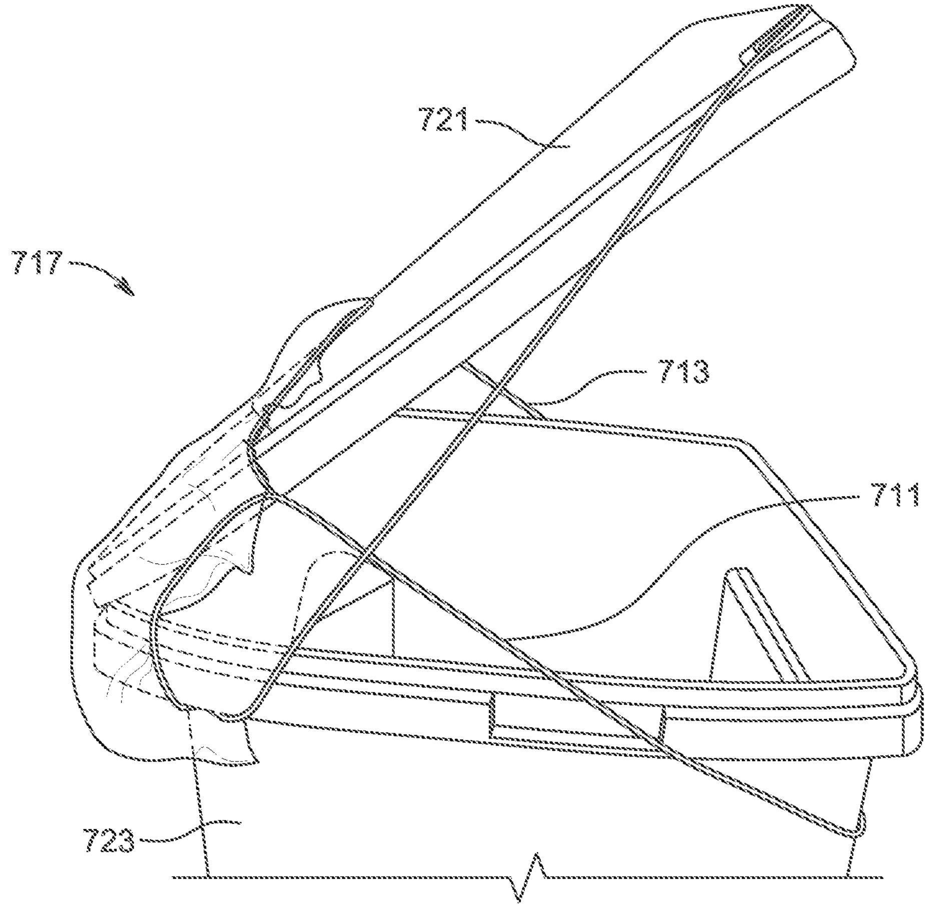
FIG. 13 is an illustration of tethers in the crisscross position with a trash can lid in an open configuration.

In the contemplated embodiment, the lid tether 711 and one or more body tethers 713 can be wrapped around the body 723 of the trash can 717 in a crisscross position with lid tether 711 wrapped around the body 723 of the trash can 717 and the body tethers 713 wrapped around the lid 721 of the trash can 717 as shown in FIGS. 12 and 13. This provides an additional mechanical advantage to resist forces encountered when trash trucks flip trash cans backward (as part of the emptying action) and return the trash cans back to the ground. The crisscross-positioned tethers create an arresting force pulling the lid shut. Therefore, protecting the lid from damage during the loading and unloading process by a trash truck. The crisscrossing of tethers automatically closes the trash can lid, preferably stopping inclement weather from entering the trash can.

It should be appreciated that other components of the covering device 701 may be used without departing from the scope of this disclosure. For example, the lid tether 709 and one or more body tethers 711 may work in conjunction with connection points 725 coupled to the lid 721 and the body 723, such as clips, studs, and/or hook-and-loop fasteners, to further secure the covering device 701 to the trash can 717.

Figure 14:
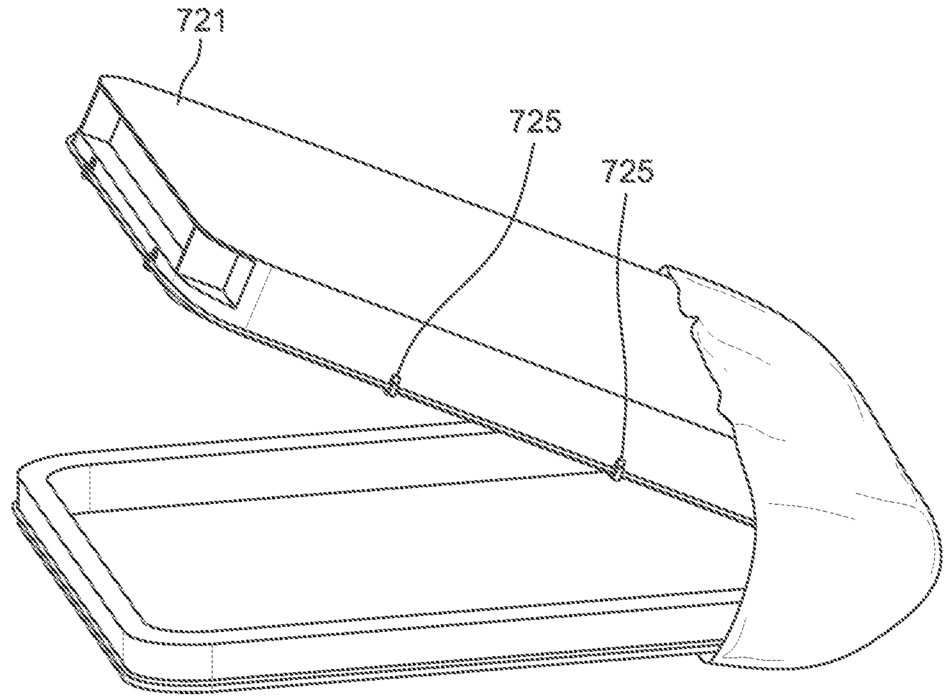
FIG. 14 is an illustration of the location and usage of tether clips with a trash can lid in an open configuration.
Figure 15:
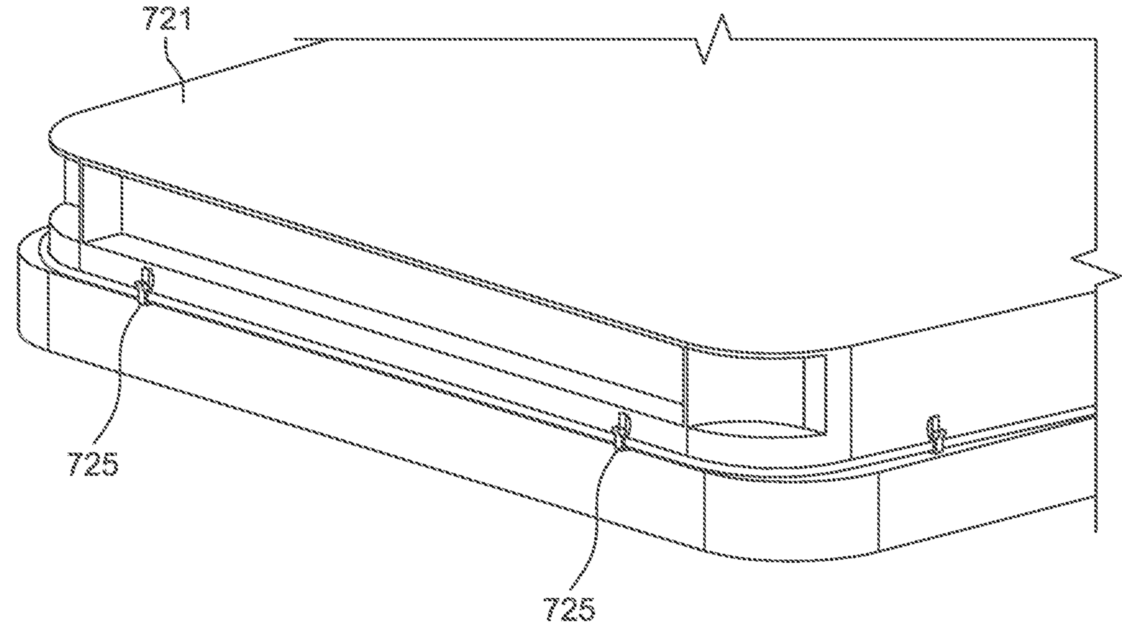
FIG. 15 is an illustration of the location and usage of tether clips with a trash can lid in a closed configuration.
Figure 16:
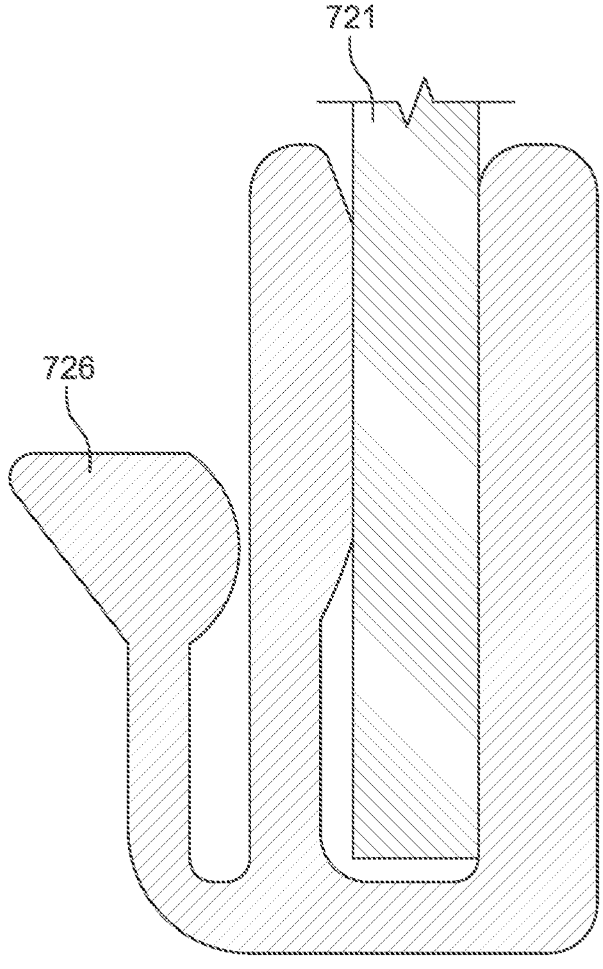
FIG. 16 is a side design view of a tether retention clip of the present invention.

The connection points 725 can be one or more clips as shown in FIGS. 14-16. The clip/s can be a tether retention clip 726 that can be mounted to any surface or edge to secure and route the required cable or tube or elastic tether through the clamp as shown in FIG. 16. The tether retention clip 726 of the present invention is uniquely designed to be mounted on any suitable edge or surface including but not limited to the trash can lids of different types, sizes, and shapes.

It should also be appreciated that the ruffled trimming 719 is a unique feature of the covering device 701 which aids in preventing insects from penetrating into the covering device 701 at any uneven edges, surfaces, overhand, etc. between the lid 721 and the body 723 of the trash can 717.

Further, it should be appreciated that the lid tether 711 and the one or more body tethers 713 are unique features to the present application for (1) preventing contamination and unwanted access from entering into the handle of the trash can, (2) allowing the trash can lid to close automatically, (3) preventing environmental elements such as inclement weather from entering into the trash can body, (4) reducing the possibility of lid breakage often caused by the violent swinging of the trash can lid when attempting to empty the trash can, and (5) eliminating the use of adhesives to attach the covering device to a trash can.

Figure 11:
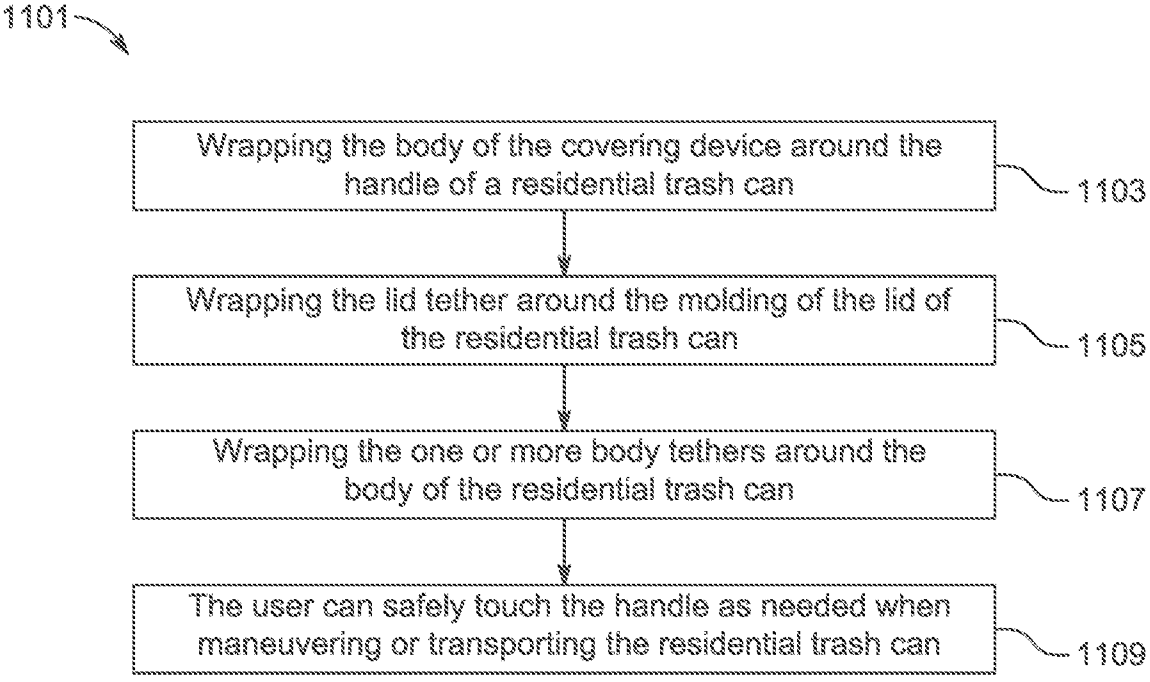
FIG. 11 is a flowchart of a method of use of the covering device of FIG. 7.

In FIG. 11, a flowchart 1101 depicts a method of use of the covering device 701. During use, the user can wrap the body of the covering device around the handle of a residential trash can, as shown with box 1103. The user can then wrap the lid tether around the molding of the lid of the residential trash can and wrap the one or more body tethers around the body residential trash can, as shown with boxes 1105, 1107. Next, the user can safely touch the handle as needed when maneuvering or transporting the residential trash can, as shown with box 1109.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. In a residential or commercial trash can having a body, a handle secured to the body, and a lid secured to the body, a covering device attachable to the residential or commercial trash can, the covering device comprising:

a flexible body surrounding the handle of the residential or commercial trash can, the body having:

an elastic band attached near or with a periphery of the flexible body, creating a ruffled trimming, a lid tether wrapped around molding of the lid of the residential or commercial trash can, the lid tether having:

a first end; and a second end;

wherein the first end and the second end of the lid tether couple to an upper portion of the flexible body of the covering; and one or more body tethers wrapped around the body of the residential or commercial trash can, the one or more body tethers having:

a first end; and a second end;

wherein the first end and the second end of the one or more body tethers couple to a lower portion of the flexible body of the covering device;

a plurality of fasteners coupled to the lid, the plurality of fasteners work in conjunction with the lid tether to serve as connection points to further secure the covering device to the residential or commercial trashcan;

wherein the one or more body tethers are elastically connected to the lid tether and are configured to stretch relative to each other;

wherein the one or more body tethers are wrapped around the body of the residential or commercial trashcan and the lid tether is wrapped around the lid of the residential or commercial trashcan; and wherein the flexible body with the one or more body tethers and the lid tether covers a partial section of the lid, the handle, and a partial section of the body.

2. The residential or commercial trash of claim 1, wherein the lid tether and the one or more body tethers are elastic bands.

* * * * *